US006458883B1

(12) United States Patent
Takashima et al.

(10) Patent No.: US 6,458,883 B1
(45) Date of Patent: Oct. 1, 2002

(54) CONDUCTIVE RUBBER COMPOSITION AND MANUFACTURING METHOD AND CONDUCTIVE RUBBER MEMBER THEREOF

(75) Inventors: Masaaki Takashima; Kiyonori Kita; Takao Yamazaki; Minoru Tsuneyoshi, all of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/480,793

(22) Filed: Jan. 11, 2000

(51) Int. Cl.$^7$ .................................................. C08K 3/04
(52) U.S. Cl. ........................ 524/495; 524/496; 252/511
(58) Field of Search .......................... 525/191; 252/511; 524/495, 496; 492/56

(56) References Cited

U.S. PATENT DOCUMENTS

| | | | | |
|---|---|---|---|---|
| 5,209,872 A | * | 5/1993 | Takahashi et al. | 252/511 |
| 5,609,554 A | * | 3/1997 | Hayashi et al. | 492/56 |
| 5,659,854 A | * | 8/1997 | Masuda et al. | 399/176 |
| 6,043,308 A | * | 3/2000 | Tanahashi et al. | 524/495 |

FOREIGN PATENT DOCUMENTS

| | | | | |
|---|---|---|---|---|
| EP | 1 020 492 A1 | * | 7/2000 | C08L/21/00 |
| JP | 4-88378 | | 3/1992 | |
| JP | 9-132677 | * | 5/1997 | C08L/21/00 |
| JP | 10-87897 | | 4/1998 | |
| JP | 10-90976 | | 4/1998 | |
| JP | 10-154416 | | 6/1998 | |
| WO | WO 97/03221 | | 1/1997 | |

* cited by examiner

Primary Examiner—David W. Wu
Assistant Examiner—Rip A. Lee
(74) Attorney, Agent, or Firm—Oblon, Spivak, McClelland, Maier & Neustadt, P.C.

(57) ABSTRACT

The present invention provides a conductive rubber composition with a low hardness and low distortion, and exhibiting less variations in volume specific resistance value and less dependence on environment, a manufacturing method thereof, and further, a conductive rubber member using the same. The conductive rubber composition of the present invention contains a particulate polymer (A1, crosslinked particulate polymer, and the like), an uncrosslinked polymer (A2), and a conductivity imparting agent (B). The particulate polymer (A1) is a nonpolar polymer (SBR, and the like), the uncrosslinked (A2) is a polar polymer (NBR, and the like), and the more conductivity imparting agent (B) exists in the uncrosslinked polymer than in the crosslinked particulate polymer. This composition can be obtained by starting the kneading of the above-described respective compounds at such a temperature (T C.) that the Mooney viscosity of the uncrosslinked polymer is equal or less than the Mooney viscosity of particulate polymer. The particulate polymer (A1) preferably has an average particle diameter of 25 mm or less, and a Duro A hardness of 45 to 80. The conductive rubber member, according to the present invention, can be obtained by molding the above-described conductive rubber composition and then vulcanizing it.

18 Claims, No Drawings

CONDUCTIVE RUBBER COMPOSITION AND MANUFACTURING METHOD AND CONDUCTIVE RUBBER MEMBER THEREOF

BACKGROUND OF THE INVENTION

1. Field of the Invention

The present invention relates to a conductive rubber composition, and a manufacturing method and a conductive rubber member thereof. More particularly, it relates to a conductive rubber composition having a low hardness and a low distortion, and exhibiting a small range of variations in its volume specific resistance value and low dependence on environment, and a manufacturing method thereof. Further, it relates to a conductive rubber member obtained using this composition and used in image forming apparatuses such as electrophotographic apparatuses and electrostatic recording apparatuses.

The present invention provides wide application in rubber members used in auto parts, hoses, belts, various rolls for copiers, facsimiles, printers, and the like, footwear, AV devices, OA devices, sealants, and the like, especially, various rubber members used in printers by means of electrophotography, electrostatic recording, and the like.

2. Prior Art

In recent years, semi-conductive elastic rolls have received attention as transferring members, and contact charging members with respect to toners of dry electrophotographic apparatuses with advances in electrophotographic technology. Thus, they are used for developing rolls, transferring rolls, and the like. The semi-conductive members used for such applications are required not only to have prescribed electric resistance values, but also to exhibit a small range of positional variations in electric resistance and low dependence of the electric resistance on the applied voltage, and to vary less in electric resistance when continuously energized. They are further required to have a narrow range of variations in electric resistance values even for environmental changes ranging from low temperature and low humidity to high temperature and high humidity.

In general, conductivity (volume specific resistance value: $1\times10^6$ Ω·cm or less) is imparted by mixing of carbon black and the like. Accordingly, with a conventional method, the dosage thereof is increased, and hence the viscosity of the system is increased, thereby interfering with the processability and raising the hardness. Consequently, the contact area with a photosensitizing drum decreases, entailing a problem in printing properties. For preventing this, there is known a conductive rubber composition having a prescribed electric resistance and hardness, and suitable as a rubber material for electrically conductive blades used in image forming apparatuses such as electrophotographic copying machines and electrostatic recording apparatuses (Japanese Patent Laid-Open Publication No. Hei-10-87897). This composition contains a vulcanized product of a rubber component A (epoxy containing rubber, and the like.), a rubber component B (SBR, NBR, and the like.) vulcanized by a different mechanism from the case of the rubber component A, and conductive particles. The conductivity and hardness are adjusted in a prescribed range by increasing the concentration of the conductive particles in the rubber component B. However, a considerable portion of the conductive particles transfers toward the rubber component A during kneading. Accordingly, it is difficult to impart the desired conductivity with stability. Further, the composition requires two types of vulcanizing agents each having a different vulcanization mechanism. Thus, two-step vulcanization is required to be carried out, resulting in a complicated procedure. Further, in WO97/03122, there is disclosed a method for manufacturing a conductive rubber composition, which comprises: a step of kneading a rubber component (A), a rubber component (B) to be vulcanized by a different mechanism from the case of the rubber component (A), and the vulcanizing agent of the rubber component (A) to vulcanize only the rubber component (A), and a step of subsequently adding the vulcanizing agent of the rubber component (B), and conductive particles thereto. However, this method also entails insufficient dispersion of the conductive particles, resulting in variations in conductivity.

Further, when a plasticizer and a softening agent are added in large amounts to achieve lower hardness, insufficient dispersion of a conductivity imparting agent unacceptably occurs, resulting in variations in conductivity.

[Problems to be Solved by the Invention]

The present invention has been achieved in view of the foregoing. It is therefore an object of the present invention to provide a conductive rubber composition which not only shows a prescribed electric resistance value, but also varies less in electric resistance, and has a narrow range of variations in electrical resistance values even for environmental changes ranging from low temperature and low humidity to high temperature and high humidity, and is excellent in low hardness and low compression set. It is a further object of the present invention to provide a method for manufacturing such a conductive rubber composition, and a conductive rubber member obtained using this composition.

SUMMARY OF THE INVENTION

The present inventors have conducted a rigorous study, and consequently they have found that the objects of the present invention can be achieved by providing the following conductive rubber composition. That is, the composition contains a crosslinked particulate polymer (A1), an uncrosslinked polymer (A2, generally a linear polymer), and a conductivity imparting agent (B), and the aforesaid conductivity imparting agent (B) is unevenly distributed and the more conductivity imparting agent (B) exist in the uncrosslinked polymer (A2) than in the crosslinked particulate polymer (A1) by starting the kneading at such a temperature that the Moony viscosity of the uncrosslinked polymer is equal to or less than the Moony viscosity of the crosslinked particulate polymer. The present invention has been achieved based on this finding.

A conductive rubber composition, according to a first aspect of the present invention, is characterized by comprising: a crosslinked particulate polymer (A1), an uncrosslinked polymer (A2), and a conductivity imparting agent (B), wherein the aforesaid crosslinked particulate polymer (A1) is a nonpolar polymer, the aforesaid uncrosslinked polymer (A2) is a polar polymer, and the aforesaid conductivity imparting agent (B) is unevenly distributed and the more conductivity imparting agent (B) exist in the uncrosslinked polymer (A2) than in the crosslinked particulate polymer (A1).

A method for manufacturing a conductive rubber composition, according to a second aspect of the present invention, is characterized by comprising: a step of starting the kneading of the composition at such a temperature (T° C.) wherein the following expression (1) holds, the aforesaid composition comprising a crosslinked particulate polymer (A1), an uncrosslinked polymer (A2), and a conductivity imparting agent (B), the crosslinked particulate polymer (A1) being a nonpolar polymer, and the uncrosslinked polymer (A2) being a polar polymer, where the temperature (T° C.) denotes the temperature at which kneading is started, that is, it is not a temperature during kneading, but it virtually represents the set temperature of a kneading machine:

Moony viscosity (T° C.) of the uncrosslinked polymer (A2)/Moony viscosity (T° C.) of the crosslinked particulate polymer $$(A1) \leq 1.0 \tag{1}$$

Each of these Moony viscosities is individually determined for the crosslinked particulate polymer and the uncrosslinked polymer at the fourth minute after preheating each polymer for 1 minute at a prescribed temperature, and then rotating it for 4 minutes at 2 rpm using a rotor.

A conductive rubber member, according to a third aspect of the present invention, is characterized by being obtained by vulcanizing the aforesaid conductive rubber composition and used in an image forming apparatus.

[Effect of the Invention]

According to the rubber composition of the present invention, there can be provided a conductive rubber member (rubber sheet, and the like.) which exhibits a small range of positional variations in electric resistance and a narrow range of variations in electric resistance values even for environmental changes ranging from low temperature and low humidity to high temperature and high humidity, and has a low hardness and a large breaking extension, i.e., offers excellent properties in all respects in a well-balanced manner. That is, the conductive rubber member of the present invention exhibits the aforementioned excellent properties.

Further, according to the manufacturing method of the present invention, a conductive rubber composition exhibiting the excellent properties described above can be manufactured easily even without changing the type of vulcanizing agent nor performing two-stage vulcanization.

Accordingly, the rubber composition and the like of the present invention are particularly preferred for use in fields where conductivity or antistatic properties are required, such as LCD-related fields, LSI-related fields, IC-related fields, OA devices, AV devices, and home appliances, especially, charging, developing, and transferring rolls and the like of printers, copiers, and the like, using electrophotographic technology.

DETAILED DESCRIPTION OF THE INVENTION

The present invention will be described in detail below.

The "crosslinked particulate polymer (A1)" in the present invention is a nonpolar polymer. Specific examples thereof include natural rubber, isoprene rubber, butadiene rubber, styrene-butadiene rubber, butyl rubber, ethylene-α-olefin-nonconjugated diene rubbers such as ethylene-propylene-nonconjugated diene rubber, and ethylene-butene-nonconjugated diene rubber, and ethylene-vinyl acetate rubber. Among these rubbers, ethylene-propylene-nonconjugated diene rubber, butadiene rubber, and styrene-butadiene rubber are preferred. Styrene-butadiene rubber is more preferred. These rubbers may be used alone, or in blends of two or more thereof.

The crosslinked particulate polymer may has a toluene insoluble matter content of 80% by weight or more, and the content is preferably 90% by weight or more, and more preferably 92% by weight or more.

As monomers constituting the crosslinked particulate polymers, or monomers used for manufacturing thereof, ① aliphatic conjugated diene monomers and/or olefin monomers (below, referred to as "monomers ①") are essential. As the crosslinked particulate polymers, crosslinked particulate polymers obtained by copolymerizing crosslinkable monomers (below, referred to as "monomers ②") are preferred. Further, as this crosslinked particulate polymer, except the method of this copolymerization, for example, the product gained by smashing vulcanizing rubber into powders after production of it, or the product A1+A2) gained by vulcanizing only the above polymer dynamically by mixing the polymer that can be vulcanized dynamically (A1'), the polymer not to be vulcanized dynamically (an uncrosslinked polymer, A2) and a vulcanizing agent are quoted.

Examples of the aliphatic conjugated diene monomers of the aforementioned monomers ① include 1,3-butadiene, isoprene, and 2,3-dimethyl-1,3-butadiene. Further, examples of the aforementioned olefin monomers include ethylene, propylene, butene, styrene, α-methylstyrene, and vinyltoluene. These monomers can be used alone or in mixtures of two or more thereof. In the repeating unit in the particulate copolymer, the content of the monomer ① unit is in the range of 10 to 95 mol %, and preferably in the range of 30 to 90 mol %. When the content of the monomer ① unit is less than 10 mol %, the resulting conductive rubber composition has insufficient mechanical properties. On the other hand, when it exceeds 95 mol %, the resulting conductive composition has an insufficient conductivity. Thus, both the cases are undesirable.

Examples of the nonconjugated diene monomers used for the ethylene-α-olefin-nonconjugated diene rubbers include cyclopentadiene, dicyclopentadiene, tricyclopentadiene, 5-methyl-2,5-norbornadiene, 5-methyl-2-norbornene,5-isopropenyl-2-norbornene, 5-(1-butenyl)2-norbornene, cyclooctadiene, vinylcyclohexene, 1,5,9-cyclododecatriene, 6-methyl-4,7,8,9-tetrahydroindene, 2,2'-dicyclopentenyl, trans-1,2-divinylcyclobutane, 2-methyl-1,4-hexadiene, 1,6-octadiene, 1,7-octadiene, 1,4-hexadiene, 1,8-nonadiene, 1,9-decadiene, 3,4,7-octatriene, 5-methyl-1,8-nonadiene, dicyclooctadiene, methylenenorbornene, and 5-ethylidene-2-norbornene and the like. These may be used alone, or in mixtures of two or more thereof.

Examples of the aforementioned monomer ② include ethylene glycol di(meth)acrylate, propylene glycol-di(meth)acrylate, 1,4-butanediol-di(meth)acrylate, 1,6-hexanediol-di(meth)acrylate, trimethylolpropane di(meth)acrylate, trimethylolpropane-tri(meth)acrylate, pentaerithritol-tri(meth)acrylate, pentaerithritol-tetra(meth)acrylate, divinylbenzene, diisopropenylbenzene, trivinylbenzene, and hexamethylene-di(meth)acrylate. These monomers ② can be used alone, or in mixtures of two or more thereof.

In the repeating unit in the particulate copolymer, the content of the monomer ② unit is in the range of 0.1 to 20 mol %, and preferably in the range of 0.5 to 10 mol %. When the content of the monomer ② unit is less than 0.1 mol %, the resulting conductive rubber composition has an insufficient conductivity. On the other hand, when it exceeds 20 mol %, the resulting conductive rubber composition has insufficient mechanical properties. Thus, both cases are undesirable.

The aforementioned crosslinked particulate polymer can be manufactured by an emulsion polymerization method or a suspension polymerization method using a radical initiator. However, the emulsion polymerization method is preferred in small sizes of the particle size and uniformity of the particle size. Examples of the radical initiator include (1) organic peroxides such as benzoyl peroxide, lauroyl peroxide, t-butyl hydropeoxide, cumene hydroperoxide, para-menthane hydroperoxide, di-t-butyl peroxide, and dicumyl peroxide; (2) diazo compounds typically including azoisobutyronitrile; (3) inorganic peroxides typically including potassium persulfate; and (4) redox system catalysts typically including combinations of these peroxides and ferrous sulfate. These radical initiators can be used alone, or in mixtures of two or more thereof.

Examples of the emulsifying agent used for emulsion polymerization include anionic surfactants, nonionic surfactants, cationic surfactants, and amphoteric surfactants. These surfactants may also be fluorine-based surfactants. These emulsifying agents can be used alone, or in mixtures of two or more thereof.

Examples of the suspension stabilizer used for suspension polymerization include polyvinyl alcohol, sodium polyacrylate, and hydroxyethyl cellulose. These suspension stabilizers can be used alone, or in combination of two or more thereof. In emulsion polymerization or suspension polymerization, polymerization drugs such as each monomer and radical initiator may be added in total amounts at the time of starting the reaction.

Although the polymerization is generally carried out at 0 to 80° C. in a reactor where oxygen has been removed, the operation conditions such as temperature and stirring can also be changed appropriately during the reaction. The polymerization can be accomplished by either a continuous process or a batch process.

The average particle diameter of the crosslinked particulate polymer (A1) may be 25 μm or less, preferably 10 μm or less, and more preferably 5 μm or less. When it exceeds 25 μm, variations undesirably occur in the volume specific resistance value of the resulting conductive rubber composition.

The hardness of the crosslinked particulate polymer (A1) is preferably in the range of 45 to 80 in duro A. When it is 45 or less, the degree of uneven distribution of the conductivity imparting agent (B) in the uncrosslinked polymer (A2) is reduced. Accordingly, the conductivity imparting agent (B) must be undesirably increased in an amount for providing the desired conductivity, resulting in an increase in hardness. On the other hand, when it exceeds 80, the resulting conductive rubber composition undesirably has insufficient mechanical properties.

The uncrosslinked polymer (A2) in the present invention is a polar polymer, and generally linear polymer. Specific examples thereof include chloroprene rubber, acrylonitrile-butadiene rubber, hydrogenated acrylonitrile-butadiene rubber, acrylic rubber, ethylene-acrylic rubber, chlorosulfonated polyethylene, polysulfide rubber, epichlorohydrin rubber, epichloroethylene oxide rubber, urethane rubber, silicone rubber, and fluororubber. Among these rubbers, acrylonitrile-butadiene rubber, hydrogenated acrylonitrile-butadiene rubber, acrylic rubber, ethylene-acrylic rubber, chloroprene rubber, chlorosulfonated polyethylene rubber, urethane rubber, epichlorohydrin rubber, and epichlorohydrin-ethylene oxide rubber are preferred. Acrylic rubber or acrylonitrile-butadiene rubber is preferable. These rubbers may be used alone, or in blends of two or more thereof.

The blending ratio (weight ratio)of the crosslinked particulate polymer (A1) to the uncrosslinked polymer (A2) is 10/90 to 90/10, preferably 20/80 to 80/20, and more preferably 25/75 to 75/25. When the ratio of the crosslinked particulate polymer (A1) is less than 10, the conductivity imparting agent (B) is undesirably required to be added in a large amount in order to obtain the desired volume specific resistance value. On the other hand, when it exceeds 90, the mechanical properties undesirably become insufficient.

Further, a difference in the solubility parameter between said uncrosslinked polymer (A2) and the crosslinked particulate polymer (A1) may be not less than 0.5, the difference is preferably not less than 0.6, and more preferably not less than 0.7, and generally not more than 5. Further, the difference is generally 0.7–3.0, and preferably 0.7–2.5.

The conductivity imparting agent (B) in the present invention reduces the electric resistance of the polymers by being dispersed in the polymers. In general, it takes the form of a particle.

Specific examples of the conductivity imparting agent (B) include (1) carbon blacks such as EC (Extra Conductive), ECF (Extra Conductive Furnace), SCF (Super Conductive Furnace), CF (Conductive Furnace), and acetylene black (including Ketjen black EC (EC600JD)), SAF (Super Abrasion Furnace), ISAF (Intermediate SAF), HAF (High Abrasion Furnace), FEF (Fast Extruding Furnace), GPF (General Purpose Furnace), SAF (Semi-Reinforcing Furnace), FT (Fine Furnace), and MT (Medium Thermal); (2) metal oxides such as ZnO (Al doped), $SnO_2$ (antimony oxide doped), TiO2, SnO2 (antimony oxide doped), metal-coated SnO2, metal-coated TiO2, K20-nTiO2/SnO2 (antimony oxide doped), SnO2 (antimony oxide doped), and metal-coated composite oxide; (3) metal single bodies such as copper powder, silver powder, and aluminium powder; and (4) conductive polymers such as polyaniline, polypyrrole, and polyacetylene. Among them, carbon blacks are preferred.

The primary particle diameter of the conductivity imparting agent (B), especially of the carbon black is in the range of 10 to 100 nm, preferably 20 to 80 nm, and more preferably 30 to 60 nm. The amount of the conductivity imparting agent (B) to be added is preferably in the range of 0.5 to 100 parts by weight, more preferably 1 to 50 parts by weight, and most preferably 2 to 40 parts by weight. When it is less than 0.5 parts by weight, an error in measurement in weighing at the time of addition presents a problem. On the other hand, when it exceeds 100 parts by weight, the low hardness and low compression set characteristics are undesirably impaired.

The conductive rubber composition of the present invention is manufactured, for example, by the following methods:

(1) a method in which a crosslinked particulate polymer, an uncrosslinked polymer, and a conductivity imparting agent are kneaded by means of a kneading machine;

(2) a method in which a water dispersion or an emulsion of an uncrosslinked polymer, and a water dispersion or an emulsion of a crosslinked particulate polymer are mixed, followed by solidifying and drying, and then a conductivity imparting substance is kneaded therein by means of a kneading machine; or (3) a method in which an uncrosslinked polymer and a conductivity imparting agent are previously kneaded by means of a kneading machine, and then a crosslinked particulate polymer is added and kneaded therein.

Examples of a kneading machine include closed kneading machines (for example, Banbury mixer, internal mixer, and kneader), and open rolls. As the kneading conditions, the kneading starting temperature (the set temperature of a kneading machine) is such a temperature that the above-described expression holds between the Moony viscosities of the crosslinked particulate polymer (A1) and the uncrosslinked polymer (A2). If it falls outside the condition, the degree of uneven distribution of the conductivity imparting agent (B) in the uncrosslinked polymer in the resulting conductive rubber composition becomes insufficient. As a result, undesirably, the volume specific resistance value does not reach the desired level sufficiently, and further, variations increase with each manufacturing. In addition, variations undesirably increase in mechanical properties.

For example, when the crosslinked particulate polymer (A1) is styrene-butadiene series rubber, and the uncrosslinked polymer (A2) is acrylonitrile-butadiene series rubber, the kneading starting temperature can be 80° C. or more (preferably 90° C. or more, generally 150° C. or less).

In the conductive rubber composition of the present invention, if required, ionic conductivity imparting agents, vulcanizing agents, fillers, colorants, lubricants, metal oxides, softening agents, plasticizers, aging inhibitors, processing aids, scorch retarders, pulling agents, oxidation inhibitors, activators, ultraviolet absorbers, tackifiers, dehydrating agents, waxes, light stabilizers, internal mold lubricants, foaming agents, foaming aids, antibacterial agents, flame retardants, peptizing agents, and the like can be added.

Examples of the ionic conductivity imparting agent include salts of the group I metals of the Periodic Table such as $LiCF_3SO_3$, $NaClO_4$, $LiClO_4$, $LiAsF_6$, $LiBF_4$, NaSCN, KSCN, and NaCl; ammonium salts such as $NH_4Cl$, $NH_4SO_4$, $NH_4NO_3$, and quaternary ammonium salts of perchloric acid; salts of the group II metals of the Periodic Table such as $Ca(ClO_4)_2$, and $Ba(ClO_4)_2$; complexes of these salts and polyhydric alcohols such as 1,4-butane diol, ethylene glycol, polyethylene glycol, propylene glycol, and polypropylene glycol or derivatives thereof; complexes of these salts and monools such as ethylene glycol monomethyl ether, ethylene glycol monoethyl ether, polyethylene glycol monomethyl ether, and polyethylene glycol monoethyl ether; cationic surfactants such as quaternary ammonium salts; anionic surfactants such as aliphatic sulfonates, alkylsulfuric acid ester salts, and alkylphosphoric acid ester salts; nonionic surfactants such as polyethylene glycol adducts of higher alcohols and fatty acid diesters of polyalkylene glycol; and amphoteric surfactants such as betaine.

The above-described quaternary ammonium salts of perchloric acid are represented, for example, by the following general formula (I). The above-described aliphatic carboxylic acid diesters of polyalkylene glycol are represented, for example, by the following general formula (II). Examples thereof include at least one compound selected from the group consisting of the quaternary ammonium salts of perchloric acid and/or aliphatic carboxylic acid diesters of polyalkylene glycol.

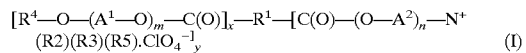  (I)

(where $R^1$ denotes a group other than all the carboxyl groups of an aliphatic or aromatic carboxylic acid of 2 to 20 carbon atoms; $R^2$ and $R^3$ each individually denote an alkyl group of 1 to 20 carbon atoms or a hydroxyalkyl group of 1 to 20 carbon atoms; $A^1$ and $A^2$ each individually denote an alkylene group of 2 to 4 carbon atoms; m is an integer of 0 to 20; n is an integer of 1 to 20; $R^4$ denotes an alkyl group of 4 to 22 carbon atoms, an aralkyl group of 7 to 20 carbon atoms, or R' CONHR" (where R' is an alkyl group of 1 to 20 carbon atoms or an alkenyl group of 1 to 20 carbon atoms, and R" is an alkylene group of 1 to 10 carbon atoms.); $R^5$ denotes an alkyl group of 1 to 20 carbon atoms; x is an integer of 0 to 3; y is an integer of 1 to 4; and (x+y) equals the valence of $R^1$.)

$$R^6—C(O)—O—(R^7—O)_k—C(O)—R^8 \quad (II)$$

(where $R^6$ and $R^8$ each individually denote a group other than the carboxyl groups of an aliphatic monocarboxylic acid of 4 to 18 carbon atoms; $R^7$ denotes an alkylene group of 2 to 4 carbon atoms; and k is an integer of 2 to 30.)

Different vulcanizing agents can be used depending upon the rubber species used. Examples thereof include sulfur containing vulcanizing agents, organic peroxides, quinoid vulcanizing agents, resin vulcanizing agents, metal oxide vulcanizing agents, sulfur containing organic compounds, amine vulcanizing agents, triazine containing vulcanizing agents, polyol vulcanizing agents, metal soap containing vulcanizing agents, and maleimide containing vulcanizing agents.

Examples of the sulfur containing vulcanizing agents include powder sulfur, flowers of sulfur, high-dispersion sulfur, insoluble sulfur, precipitated sulfur, surface-treated sulfur, colloid sulfur, sulfur chloride, sulfur monochloride, and sulfur dichloride. When the sulfur containing vulcanizing agent is used, a vulcanization accelerator can be used.

Specific examples of the vulcanization accelerator include (1) aldehyde ammonias such as hexamethylenetetramine and acetaldehyde-ammonia; (2) aldehyde amines such as n-butyl aldehyde-aniline condensation product, butyl aldehyde-monobutylamine condensation product, heptaldehyde-aniline reaction product, and tricrotonylidene tetramine; (3) guanidine salts such as diphenylguanidine, di-o-tolylguanidine, ortho tolyl biguanide, and diortho tolyl guanidine salts of dicatechol borate; (4) imidazolines such as 2-mercaptoimidazoline; (5) thiazoles such as 2-mercaptobenzothiazole, 2-mercaptothiazoline, dibenzothiazyl disulfide, zinc salt of 2-mercaptobenzothiazole, sodium salt of 2-mercaptobenzothiazole, cyclohexylamine salt of 2-mercaptobenzothiazole, 2-(2,4-dinitrophenylthio) benzothiazole, 2-(N,N-diethylthio carbamoylthio) benzothiazole, 2-(4'-morpholino dithio)benzothiazole, and 4-morphonyl-2-benzothiazyl disulfide; (6) sulfeneamides such as N-cyclohexyl-2-benzothiazyl sulfeneamide, N,N-dicyclohexyl-2-benzothiazyl sulfeneamide, N-oxydiethylene-2-benzothiazyl sulfeneamide, N,N-diisoprpyl-2-benzothiazyl sulfeneamide, and N-tert-butyl-2-benzothiazyl sulfeneamide; (7) thioureas such as thiocarbamide, ethylene thiourea(2-mercaptoimidazoline), diethyl thiourea, dibutyl thiorurea, mixed alykyl thiourea, trimethyl thiourea, and dilauryl thiourea; (8) dithiocarbamates such as sodium dimethyldithiocarbamate, sodium diethyldithiocarbamate, sodium di-n-butylcarbamate, lead dimethyldithiocarbamate, lead diamyldithiocarbamate, zinc dimethyldithiocarbamate, zinc diamyldithiocarbamate, zinc diethyldithiocarbamate, zinc di-n-butyldithiocarbamate, zinc dibenzyldithiocarbamate, zinc N-pentamethylenedithiocarbamate, zinc ethylphenyldithiocarbamate, selenium dimethyldithiocarbamate, selenium diethyldithiocarbamate, tellurium diethyldithiocarbamate, cadmium diethyldithiocarbamate, copper dimethyldithiocarbamate, iron dimethyldithiocarbamate, bismuth dimethyldithiocarbamate, piperidine dimethyldithiocarbamate, pipecoline methylpentamethylenedithiocarbamate, and activated dithiocarbamate; (9) thiurams such as tetramethylthiuram monosulfide, tetramethylthiuram disulfide, activated tetramethylthiuram disulfide, tetraethylthiuram disulfide, tetrabutylthiuram disulfide, N,N'-dimethyl-N,N'-diphenylthiuram disulfide, dipentamethylenethiuram disulfide, dipentamethylenethiuram tetrasulfide, and mixed alkyl thiuram disulfide; (10) xanthates such as sodium isopropyl xanthogenate, zinc isopropyl xanthogenate, and zinc butyl xanthogenate; and (11) 4,4'-dithiomorpholine, aminodialkyl dithiophosphate, zinc-o, o-n-butyl phosphorodithioate, 3-mercaptoimidazoline-thione-2, and thioglycolic acid ester. These can be used alone, or in mixtures of two or more thereof.

Examples of the organic peroxides include 1,1-di-tert-butylperoxy-3,3,5-trimethylcyclohexane, di-tert-butyl peroxide, tert-butylcumyl peroxide, di-cumyl peroxide, 2,5-di-methyl-2,5-di(tert-butylperoxy)hexane, 2,5-di-methyl-2,5-di(tert-butylperoxy)hexyne, 1,3-bis(tert-butylperoxy-isopropyl)benzene, tert-butylperoxy-isopropyl carbonate, acetylcyclohexylsulfonyl peroxide, isobutyl peroxide, di-isopropylperoxy dicarbonate, di-allylperoxy dicarbonate, di-n-propylperoxy dicarbonate, di-(2-ethoxyethyl)peroxy dicarbonate, di(methoxyisopropyl)peroxy dicarbonate, di(2-ethylhexyl)peroxy dicarbonate, tert-hexylperoxy neohexanate, di(3-methyl-3-methyloxybutyl)peroxy dicarbonate, tert-butylperoxy neodecanate, tert-hexylperoxy neodecanate, tert-butylperoxy neohexanate, 2,4-dichlorobenzoyl peroxide, tert-hexylperoxy pivalate, tert-butylperoxypivalate, 3,3,5-trimethylhexanoyl peroxide, octanoyl peroxide, decanoyl peroxide, lauroyl peroxide, cumylperoxy octate, acetyl peroxide, tert-butylperoxy(2-ethylhexanate), benzoyl peroxide, tert-butylperoxy isoisobutyrate, 1,1-bis(tert-butylperoxy)cyclohexane, tert-butylperoxymaleic acid, tert-butylperoxy laurate, tert-butylperoxy 3,3,5-trimethylhexanate, cyclohexanone peroxide, tert-butylperoxy allyl carbonate, 2,5-dimethyl-2,5-di(benzoylperoxy)hexane, 2,2,-bis(tert-butylperoxy) octane, tert-butylperoxy acetate, 2,2-bis(tert-butylperoxy) butane, tert-butylperoxy benzoate, n-butyl-4,4-bis(tert-butylperoxy)valerate, di-tert-butyldiperoxy isophthalate, methyl ethyl ketone peroxide, α, α'-bis(tert-butylperoxy-m-isopropyl)hexane, di-isopropylbenzene-hydroperoxide, p-methane hydroperoxide, 1,1,3,3-tetramethylbutyl hydroperoxide, 2,5,-dimethylhexane-2,5-dihydroperoxide, cumene hydroperoxide, and tert-butyl hydroperoxide. These can be used alone, or in mixtures of two or more thereof.

When an organic peroxide is used as a vulcanizing agent, a co-crosslinking agent can be added in combination with the organic peroxide. Examples of the co-crosslinking agent include p-quinonedioxime, p-benzoquinonedioxime, p,p'-dibenzoylquinonedioxime, tetrachloro-p-benzoquinone, poly-p-dinitrobenzene, N-methyl-N'-4-dinitrosoaniline, N,N'-m-phenylenedimaleimide, dipentamethylenethiuram pentasulfide, dinitrosobenzene, divinylbenzene, triallyl cyanurate, triallyl isocyanurate, triazine thiol, ethylene glycol dimethacrylate, diethylene glycol dimethacrylate, triethylene glycol dimethacrylate, polyethylene glycol dimethacrylate, neopentyl glycol dimethacrylate, dipropylene glycol dimethacrylate, trimethylolpropane triacrylate, erithritol tetramethacrylate, trimethylolpropane trimethacrylate, diallyl melamine, trimethacrylate, dimethacrylate, divinyl adipate, vinyl butyrate, vinyl stearate, liquid polybutadiene rubber, liquid polyisoprene rubber, liquid styrene-butadiene rubber, liquid acrylonitrile-butadiene rubber, magnesium diacrylate, calcium diacrylate, aluminium acrylate, zinc acrylate, stannous acrylate, zinc methacrylate, magnesium methacrylate, and zinc dimethacrylate.

Examples of the resin vulcanizing agent include alkylphenol-formaldehyde resin, melamine-formaldehyde condensation product, triazine-formaldehyde condensation product, octylphenol-formaldehyde resin, alkylphenol sulfide resin, and hexamethoxymethyl melamine resin.

Examples of the metal oxide vulcanizing agent include zinc oxide, magnesium oxide, and lead monoxide.

Examples of the sulfur containing organic vulcanizing agents include morpholine disulfide, alkylphenol disulfide, N,N-[dithio-bis(hexahydro-2H-azepinone-2), thiuram polysulfide, and 2-(4-[morpholinodithio]benzothiazole.

Examples of the polyamine containing vulcanizing agents include hexamethylenediamine carbamate, N,N'-1,6-hexanediamine, hexamethylenediamine, triethylene tetramine, tetraethylene pentamine, 4,4'-methylenebis (cyclohexylamine)carbamate, N,N'-dicynnamylidene-1,6-hexadiamine, and ammonium benzoate.

Examples of the triazine containing vulcanizing agents include 2,4,6-trimercapto-S-triazine, and 2-di-n-butylamino-4,6-dimercapto-s-triazine.

Examples of the polyol containing vulcanizing agents include bisphenol A, bisphenol AF, hydroquinone, and pentaerithritol.

Examples of the metal soap containing vulcanizing agents include sodium stearate, potassium stearate, sodium oleate, and potassium oleate.

Examples of the maleimide containing vulcanizing agents include N,N'-m-phenylenedimaleimide.

Examples of the filler include ground calcium carbonate, chalk, light calcium carbonate, microfine activated calcium carbonate, special calcium, basic magnesium carbonate, kaolin clay, calcined clay, pyrophylite clay, silan-finished clay, natural silicic acid, synthetic silicic anhydride, synthetic hydrous silicic acid, synthetic calcium silicate, synthetic magnesium silicate, synthetic aluminium silicate, magnesium carbonate, aluminium hydroxide, magnesium hydroxide, magnesium oxide, kaolin, sericite, talk, powder talk, wallastonite, zeolite, xonotlite, mica, asbestos, PMF (Processed Mineral Fiber), sepiolite, potassium titanate, elestadite, gypsum fiber, glass balloon, silica balloon, hydrotalcite, fly ash balloon, shirasu balloon, carbonaceous balloon, organic balloons such as phenol resin, urea resin, styrene resin, and saran resin, alumina, barium sulfate, aluminium sulfate, calcium sulfate, molybdenum disulfide, graphite, glass fiber (chopped strand, roving, milled glass fiber, and glass flake), cut fiber, rock fiber, micro fiber, carbon fiber, aromatic polyamide fiber, potassium titanate fiber, reclaimed rubber, rubber powder, ebonite powder, shellac, and wood flour.

Examples of the colorant include (1) inorganic pigments such as titanium oxide, zinc oxide, lithopone, barite, precipitated barium sulfate, calcium carbonate, gypsum, carbon black, white lead, and red iron oxide; and (2) organic pigments such as insoluble disazo type, condensation azo type, isoindolinone type, benzimidazolone type and aniline black.

Examples of the lubricant include stearic acid, oleic acid, lauric acid, dibutylammonium oleate, zinc stearate, calcium stearate, potassium stearate, and sodium stearate.

Examples of the metal oxide include zinc white, active zinc white, surface-treated zinc white, zinc carbonate, composite zinc white, composite active zinc white, surface-treated magnesium oxide, magnesium oxide, calcium hydroxide, microfine calcium hydroxide, lead monoxide, red lead, and white lead.

The following typical method is performed as the method of low hardening of the conductive composition of the present invention. The method adding a softening agent and a plasticizer and/or the method making sponge rubber adding a foaming agent and foaming assistant agent is is effective. In the above there are a lot of problems, because the variation of electrical resistance of a solid rubber is apt to be amplified further by changing solid rubber to sponge rubber. However, according to the conductive rubber composition of the present invention, the variation of electrical resistance of solid rubber is so very small that the dispersion of electrical resistance of a sponge rubber is also small. Examples of the foaming agent include an inorganic foaming agent such as ammonium carbonate, sodium bicarbonate and sodium nitrate anhydride and the like; and an organic foaming agent such as dinitorosopentametylenetetraminn, N,N'-dimetyl-N,N'dinitrosoterephthalamide, benzenesurufonylhydrazid, p,p'-oxybis(benzenesufonyl hydrazide), 3,3'-disurfonehydrazidediphenyl sulufone, azobisobutyronitrile, azobisformamide. These may be used alone, or in mixtures of two or more thereof. Further, it is also possible to use the foaming aids such as azo-system, organic acid-system, metal salt-system and the like with the above-mentioned foaming agent.

Examples of the softening agent include petroleum softening agents, vegetable oil softening agents, and factices. Examples of the petroleum softening agents include aromatic type, naphthenic type, and paraffinic type softening agents. Examples of the vegetable oil softening agents include castor oil, cotton-seed oil, linseed oil, rape seed oil, soybean oil, palm oil, copra oil, arachis oil, and Japan wax. Examples of the factices include black factice, white factice, and semitransparent factice. Out of these, since a development roll is required to have no reactivity with a toner (to be excellent in elimination from a toner), the paraffinic and naphthenic types are particularly preferred in this regard.

Examples of the plasticizer include phthalic acid type, isophthalic acid type, tetrahydrophthalic acid type, adipic acid type, azelaic acid type, sebacic acid type, dodecane-2-acid type, maleic acid type, fumaric acid type, trimellitic acid type, citric acid type, itaconic acid type, ricinolic acid type, stearic acid type, polyether type, polyester type, polyether ester type, phosphate type, glycol type, and epoxy type plasticizers. Among them, sebacic acid type is preferred in terms of elimination from a toner.

Examples of the aging inhibitor include naphthylamine type, diphenylamine type, p-phenylenediamine type, quinoline type, hydroquinone derivative type, mono-, bis-, tris-, poly-phenol type, thiobisphenol type, hindered phenol type, phosphite type, imidazole type, nickel dithiocarbamate type, and phosphoric acid type aging inhibitors.

The conductive rubber composition obtained by the above-described method is then vulcanized to manufacture a conductive rubber member. In this process, in order to vulcanize (crosslink) the conductive rubber composition, a vulcanizing agent (crosslinking agent) is added by a kneading machine, followed by crosslinking forming. As this vulcanizing agent, the ones described above can be used. Further, when the kneading temperature is low, or when the vulcanizing agent fails to react during kneading as in the case of a vulcanizing agent requiring a high reaction temperature, it is also possible that the vulcanizing agent be previously added from the beginning and not added during kneading.

The composition is molded into the desired form to be adaptable for use as the conductive rubber members of rolls, blades, belts, and the like. There is no particular restriction on the molding method, and conventional methods can be adopted. Examples thereof include press molding, transfer molding, extrusion, and injection molding. Further, the molded products can also be subjected to crosslinking by electron beam, high-frequency wave, air heating, or the like.

The range of variations (a difference between the maximum value and the minimum value) in volume specific resistance value among the same batches is 1.0 $\Omega$·cm or less, preferably 0.5 $\Omega$·cm or less, and more preferably 0.4 $\Omega$·cm or less, under the measurement conditions shown in the following examples. Further, as for the environment dependence determined under the measurement conditions shown in the following examples, a difference between the volume specific resistance value (L/L value) at 10° C. under 15% RH, and the volume specific resistance value (H/H value) at 30° C. under 85% RH is 0.7 $\omega$·cm or less, preferably 0.5 $\Omega$·cm or less, and more preferably 0.4 $\Omega$·cm or less.

MODE FOR CARRYING OUT THE INVENTION

Below, the rubber composition, according to the present invention, will be described by way of examples, which should not be construed as limiting the scope of the present invention.

EXAMPLE 1

The crosslinked particulate polymer (A1-1) of this example was manufactured by the following method. That is, emulsion polymerization of a butadiene-styrene-divinylbenzene monomer mixture of a ratio of 70/20/10 (mol %) was carried out using sodium lauryl sulfate as an emulsifying agent and benzoyl peroxide as a polymerization initiator. The resulting copolymer emulsion was salified using calcium chloride, and dried to obtain a crosslinked particulate polymer (A1, solubility parameter value (hereinafter, referred to as "SP value"; 8.45). The polymerization conversion ratio at this step was found to be roughly 100%.

The average particle diameter of the crosslinked particulate polymer (A1-1) was determined in the following manner. The rubber composition was frozen and cut, and by a scanning transmission electron microscope, all three regions each comprised of about 50 to 100 dispersed rubber particles were selected in the cut surface, and were observed for their respective long diameter(length) and numbers of dispersed rubber particles. Thus, the number-average of the particle diameters were calculated, and the average value of the three regions was taken as the average particle diameter.

The insoluble part of toluene is a characteristic showing the degree of crosslinking of rubber component, and is determined as follows. The characteristic is the value divided the insoluble part measured precisely after measuring a crosslinked particulate polymer (A) precisely and pouring it into wire-netting basket of 325 mesh, leaving it in over-boiling toluene unattended, after 6 hours taking out the basket and drying the insoluble part, by the whole quantity of a crosslinked particulate polymer before dissolution.

The average particle diameter of the crosslinked particulate polymer (A1-1) thus determined was 0.7 $\mu$m, and the Moony viscosity was 75 (100° C.). The result of the toluene-insoluble part is shown in table 2. The hardness of the molded product obtained by compression pressing the crosslinked particulate polymer (A1-1) at 170° C. for 20 minutes was 50 (duro A) (see Table 2).

Then, as an uncrosslinked polymer (A2, a linear polymer), acrylonitrile-butadiene copolymer rubber (manufactured by JSR (Co., Ltd.) "N230S", Moony viscosity at 100° C.; 56, SP value; 10.0) was used. A difference in both SP values is 1.55 (see Table 1).

As a conductivity imparting agent (B), carbon black (manufactured by Lion (Co., Ltd.), "Ketjen Black EC600JD") was used. These and other additives were kneaded in accordance with the formulation shown in Table 1 by means of a Banbury mixer at a kneading set temperature of 100° C. to obtain a conductive rubber composition.

It is noted that the contents of other additives shown in Table 1 is as follows:
"PW380"; manufactured by Idemitsu Kosan Co., Ltd., paraffinic type softening agent,
"LV70"; manufactured by Asahi Denka Co., conductive plasticiser,
"Komorex #2, process oil"; manufactured by Nippon Oil Co., Ltd.,
"LV808"; manufactured by Asahi Denka Co., conductive plasticiser,
"RS700"; manufactured by Asahi Denka Co., non-conductive plasticiser,
"Parkadox 14/40"; manufactured by Nippon Kayaku Aquzo Co., crosslinking agent,
"Valnok PM" manufactured by Ouchi Shinko Kagaku Co., crosslinking aid,
"Nonscorch N"; manufactured by Seiko Kagaku Co., vulcanization retarder,
"DOS"; manufactured by Daihachi Kagaku, non-conductive plasticizer, and
"Komorex #2 process oil"; manufactured by Nippon Oil Co., Ltd., naphthenic type softening agent; "CL#2".
"MP100"; manufactured by Akisima chemikal industry Co., Ltd., complex salt of $NaClO_4$ and $CH_3OCH_2CH_2OCH_2CH_2OH$, and
"MP100 A"; manufactured by Akisima chemikal industry Co., Ltd., complex salt of $liClO_4$ and $CH_3OCH_2CH_2OCH_2CH_2OH$ Next, the resulting rubber composition was press cured at 170° C. for 20 minutes to produce 160 mm×160 mm×2 mm sheets and blocks (φ: 29 mm, thickness: 12.7 mm). Then, each of the sheets and blocks thus obtained was measured for its volume specific resistance value, and mechanical properties (hardness, tensile strength, breaking extension, and compression set) and a degree of existence of more carbon blacks in an uncrosslinked polymer (referred to "as a degree of uneven distribution of carbon black" also. The results are shown in Table 2.

The evaluation method adopted in this example of the present invention is as follows.
[Volume specific resistance value]; the measurement was carried out in accordance with JIS K6723 using vulcanized rubber sheets. As for environment dependence, the volume

TABLE 1

|  | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Kneading set temperature (° C.) | 100 | 100 | 80 | 100 | 100 | 100 | 100 | 100 | 100 | 50 | 100 |
| Particulate polymer (A1) | | | | | | | | | | | |
| A1-1 | 60 |  | 60 |  |  | 60 |  |  |  | 60 |  |
| A1-2 |  | 70 |  |  | 40 |  |  |  |  |  |  |
| A1-3 |  |  |  | 60 |  |  |  |  |  |  |  |
| A1-4 |  |  |  |  |  |  |  |  |  |  | 50 |
| A1-5 |  |  |  |  |  |  | 70 | 60 | 70 |  |  |
| uncrosslinked polymer (A2) | | | | | | | | | | | |
| N230S | 40 |  |  |  |  |  |  |  |  | 40 |  |
| N230S emulsion |  | 30 |  |  | 60 |  |  |  |  |  |  |
| AREX 100 |  |  | 40 |  |  |  |  |  |  |  |  |
| N230SV |  |  |  | 40 |  |  |  |  |  |  |  |
| N239SV |  |  |  |  |  | 40 |  | 40 | 30 |  |  |
| N2505L |  |  |  |  |  |  | 30 |  |  |  |  |
| SBR 1502 |  |  |  |  |  |  |  |  |  |  | 50 |
| SP value-Difference (A1 and A2) | 1.55 | 1.55 | 0.90 | 1.4 | 1.55 | 1.55 | 0.75 | 1.5 | 1.5 |  | −1.4 |
| Conductivity imparting agent (B) | | | | | | | | | | | |
| Ketjen black EC600JD | 3 |  | 4 | 2 |  |  |  |  |  | 3 |  |
| Dia black 3030B |  | 30 |  |  |  |  |  |  |  |  | 40 |
| Toka black #5500 |  |  |  |  | 15 |  |  |  |  |  |  |
| Acetylene black HS100 |  |  |  |  |  | 20 | 15 | 20 | 15 |  |  |
| Other additives | | | | | | | | | | | |
| LV70 | 5 | 5 |  | 5 | 5 |  |  |  |  | 5 |  |
| LV808 |  |  | 10 |  |  |  |  |  |  |  | 10 |
| RS700 | 10 | 10 |  | 10 | 5 |  |  |  |  | 10 | 10 |
| DOS |  |  |  |  |  | 10 | 10 |  |  |  |  |
| PW320 |  |  |  |  |  |  |  | 10 |  |  |  |
| Komorex #2 process oil |  |  |  |  |  | 10 | 10 |  |  |  |  |
| MP100 |  |  |  |  |  |  | 5 |  | 5 |  |  |
| MP100A |  |  |  |  |  |  |  | 5 | 3 |  |  |
| Stearic acid | 1 | 1 | 1 | 1 | 1 | 1 | 1 | 1 | 1 | 1 | 1 |
| Stearylamine | 1 | 1 | 1 | 1 | 1 | 1 | 1 | 1 | 1 |  |  |
| Parkadox 14/40 | 2 | 2 | 1.5 | 1.5 | 1.5 | 2 | 2 | 2 | 2 | 1.5 | 1.5 |
| Valnok PM |  |  | 1.5 |  |  |  |  |  |  |  |  |
| Nonscorch N |  | 0.1 | 0.1 |  | 0.1 | 0.1 | 0.1 | 0.1 | 0.1 |  |  |

TABLE 2

|  | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Kneading set temperature (° C.) | 100 | 100 | 80 | 80 | 100 | 100 | 100 | 100 | 100 | 50 | 100 |
| Toluene insoluble matter content of crosslinked particulate polymer | 95 | 95 | 95 | 94 | 95 | 95 | 92 | 92 | 92 | 92 | 93 |
| Moony viscosity of crosslinked particulate polymer | 75 | 75 | 75 | 68 | 75 | 75 | 65 | 65 | 65 | 70 | 60 |
| Hardness (duro A) of crosslinked particulate polymer | 50 | 50 | 50 | 49 | 50 | 50 | 48 | 48 | 48 | 50 | 60 |
| Average particle diameter of crosslinked particulate polymer (μm) | 0.7 | 0.7 | 0.7 | 0.4 | 0.7 | 0.8 | 0.8 | 0.8 | 0.8 | 0.7 | 1.0 |
| Moony viscosity of uncrosslinked polymer | 56 | 56 | 40 | 55 | 56 | 30 | 43 | 30 | 30 | 85 | 52 |
| Presence of uneven distribution of carbon black | Presence | Presence | Presence | Presence | Presence | Presence | Presence | Presence | Presence | None | None |
| Volume specific resistance value (V.R.) log ρ V(Ω.cm) |  |  |  |  |  |  |  |  |  |  |  |
| 10° C., 15% RH(L/L) | 4.8 | 5.2 | 6.5 | 7.2 | 5.5 | 7.1 | 7.2 | 6.6 | 6.6 | 7.8 | 8.0 |
| 25° C., 50% RH(M/M) | 4.7 | 5.0 | 6.2 | 6.8 | 5.3 | 6.9 | 6.8 | 6.3 | 6.2 | 7.5 | 7.5 |
| 40° C., 85% RH(H/H) | 4.7 | 4.9 | 6.0 | 6.5 | 5.2 | 6.4 | 6.5 | 6.1 | 5.9 | 6.8 | 7.0 |
| Variation between batches (n = 5) of same blending | 4.6~4.8 | 4.9~5.2 | 6.0~6.3 | 6.6~6.9 | 5.1~54 | 6.8~7.2 | 6.7~7.0 | 6.0~6.3 | 5.9~6.3 | 5.5~8.5 | 5.8~8.3 |
| Position variation in same vulcanization sheet |  |  |  |  |  |  |  |  |  |  |  |
| maximum value | 4.7 | 5.1 | 5.3 | 6.8 | 5.4 | 7.0 | 6.9 | 6.5 | 6.2 | 7.8 | 8.2 |
| minimum value | 4.6 | 4.9 | 6.1 | 6.6 | 5.2 | 6.8 | 6.7 | 6.2 | 6.0 | 7.0 | 7.2 |
| standard deviation | 0.01 | 0.02 | 0.02 | 0.02 | 0.02 | 0.03 | 0.03 | 0.04 | 0.04 | 0.30 | 0.40 |
| Mechanical properties JIS K6251 |  |  |  |  |  |  |  |  |  |  |  |
| Breaking strength (MPa) | 7.5 | 9.8 | 7.0 | 10.0 | 8.5 | 7.5 | 7.1 | 8.5 | 7.8 | 7.2 | 7.8 |
| Breaking extension (%) | 450 | 650 | 480 | 400 | 450 | 480 | 430 | 450 | 430 | 350 | 360 |
| Hardness JIS K6253 duro A | 42 | 45 | 35 | 45 | 40 | 43 | 45 | 44 | 48 | 48 | 48 |
| Compression set test CS(%) | 7 | 9 | 6 | 9 | 6 | 7 | 6 | 8 | 10 | 9 | 8 | specific resistance values were measured for 3 conditions of L/L (10° C., 15% RH), M/M (25° C., 50% RH), and H/H (30° C., 85% RH). On the other hand, 5 sheets were measured under conditions of M/M for their respective variation conditions. This value is a measured value (the maximum value and the minimum value) of variations between batches (n=5) of same blending. Further, a position variation in same vulcanization sheet is also measured. This value is a measured value (the maximum value, the minimum value and standard deviation) about areas of 25 gratings in total after dividing each length and width of length; 150 mm width; 150 mm and thickness; 2 mm into five equal parts under condition of M/M (25° C., 50% RH). These values are also shown in Table 2.

[Tensile test]; the tensile strength (MPa) and breaking extension (%) were measured in accordance with JIS K6251.

[Hardness test]; the hardness (duro A) was measured in accordance with JIS K6253.

[Compression set test]; measurement was carried out in accordance with JIS K6262 under 70° C. for 24 hours.

(Regarding whether there is a degree of uneven distribution of the carbon black or not); After freezing and cutting a test piece of the valcanization and observing the cross section by a transmission electron microscope, it is judged from whether the status that more carbon blacks exist in an uncrosslinked polymer (A2) than in a crosslinked particulate polymer (A1) is able to be confirmed or not.

EXAMPLE 2

In this example, an SBR emulsion and an NBR emulsion were mixed to obtain a blend rubber. The resulting blend rubber was tested.

As a crosslinked particulate polymer (A1-2) of this example, the copolymer emulsion (SP value; 8.45) obtained in Example 1 was used. Then, 70 parts (a reduced value on a solid content basis) of the copolymer emulsion, and 30 parts (a reduced value on a solid content basis) of the NBR emulsion (manufactured by JSR Co., Ltd., "N230S emulsion", SP value; 10.0) of Example 1 as an uncrosslinked polymer (A2-2) were mixed. The resulting mixture was then salified using calcium chloride, and dried to obtain a blend rubber (see Table 1).

As a conductivity imparting agent (B), carbon black (manufactured by Mitsubishi Carbon Co., "Dia Black 3030B") was used, and kneaded in this blend rubber in accordance with the formulation shown in Table 1 by means of a Banbury mixer at a kneading set temperature of 100° C. to obtain a conductive rubber composition. Next, the resulting rubber composition was press cured at 170° C. for 20 minutes, and subjected to the same evaluation test by the same evaluation method as described above. The results are shown in Table 2.

EXAMPLE 3

In this example, a conductive rubber composition was obtained in the same manner as in Example 1, except that acrylic rubber (manufactured by JSR Co., Ltd., "AREX100", Moony viscosity at 100° C.; 40, SP value; 9.35) was used as the uncrosslinked polymer (A2) (see Table 1).

Then, the resulting rubber composition was press cured at 170° C. for 20 minutes, and subjected to the same evaluation test by the same evaluation method as described above. The results are shown in Table 2.

EXAMPLE 4

In this example, trimethylolpropane triacrylate was used in place of divinylbenzene as a crosslinkable monomer.

The crosslinked particulate polymer (A1-3) of this example was manufactured in the following manner. That is, emulsion polymerization of a butadiene-styrene-trimethylolpropane triacrylate monomer mixture of a ratio of 70/23/7 (mol %) was carried out using sodium lauryl sulfate as an emulsifying agent and benzoyl peroxide as a polymerization initiator. The resulting copolymer emulsion was salified using calcium chloride, and dried to obtain the crosslinked particulate polymer (A1-3, SP value; 8.6). The polymerization conversion ratio at this step was found to be roughly 100%.

The average particle diameter of the crosslinked particulate polymer (A1-3) was 0.4 μm, and the Moony viscosity at 80° C. was 68. The hardness of the molded product obtained by compression pressing the resulting crosslinked particulate polymer (A1-3) at 170° C. for 20 minutes was 49 (duro A).

Then, as the uncrosslinked polymer (A2), acrylonitrile-butadiene copolymer rubber (manufactured by JSR (Co., Ltd.) "N230SV", Moony viscosity at 80° C.; 55, SP value; 10.0) was used. As the conductivity imparting agent (B), carbon black (manufactured by Lion Co., Ltd., "Ketjen Black EC600JD") was used. These were kneaded in accordance with the formulation shown in Table 1 by means of a Banbury mixer at a kneading starting temperature of 100° C. to obtain a conductive rubber composition. Then, the composition was press cured at 170° C. for 20 minutes, and subjected to the same evaluation test by the same evaluation method as described above. The results are shown in Table 2.

EXAMPLE 5

In this example, a conductive rubber composition was obtained in the same manner as in Example 2, except that the mixing ratio of the crosslinked particulate polymer (A1-2) and the uncrosslinked polymer (A2, "N230S emulsion", SP value; 10.0), and further carbon black (manufactured by Tokai Carbon Co., "Toka black #5500") was changed from the case in Example 2 (see Table 1).

Then, the resulting rubber composition was press cured at 170° C. for 20 minutes, and subjected to the same evaluation test by the same evaluation method as described above. The results are shown in Table 2.

EXAMPLE 6

In this example, a conductive rubber composition was obtained in accordance with the formulation shown in Table 1 in the same manner as in Example 1, except that acrylonitrile-butadiene copolymer rubber (manufactured by JSR Co., Ltd., "N239SV", Moony viscosity at 100° C.; 30, SP value; 10.0) was used as the uncrosslinked polymer (A2), and that carbon black (manufactured by Showa Denko K.K., "Acetylene black HS-100") was used as the conductivity imparting agent (B) (see Table 1). Then, the resulting rubber composition was press cured at 170° C. for 20 minutes, and subjected to the same evaluation test by the same evaluation method as described above. The results are shown in Table 2.

EXAMPLE 7

The emulsion polymerization of a butadiene-styrene-divinylbenzene monomer mixture of a ratio of 75/24/1 (mol %) was carried out using sodium lauryl sulfate as an emulsifying agent and benzoyl peroxide as a polymerization initiator. The resulting copolymer emulsion was salified using calcium chloride, and dried to obtain a crosslinked particulate polymer (A1-5, SP value; 8.5). The polymerization conversion ratio at this step was found to be roughly 100%.

The average particle diameter of the crosslinked particulate polymer (A1-5) was 0.7 μm, and the Moony viscosity was 65. The hardness of the molded product obtained by compression pressing the resulting crosslinked particulate polymer A1-5) at 170° C. for 20 minutes was 50 (duro A) (see Table 2).

Then, as the uncrosslinked polymer (A2), acrylonitrile-butadiene copolymer rubber (manufactured by JSR (Co., Ltd.) "N250SL", Moony viscosity at 100° C.; 43, SP value; 9.25) was used. As the conductivity imparting agent (B), carbon black (manufactured by Showa Denko K.K., "Acetylene black HS-100") was used. Thus, a conductive rubber composition was obtained in the same manner as in Example 1, except for the formulation shown in Table 1.

Then, the resulting rubber composition was press cured at 170° C. for 20 minutes, and subjected to the same evaluation test by the same evaluation method as described above. The results are shown in Table 2.

EXAMPLE 8

In this example, a conductive rubber composition was obtained in accordance with the formulation shown in Table 1 in the same manner as in Example 1, except that the crosslinked particulate polymer (A1-5) was used, acrylonitrile-butadiene copolymer rubber (manufactured by JSR Co., Ltd., "N239SV", Moony viscosity at 100° C.; 30, SP value; 10.0) was used as the uncrosslinked polymer (A2), and carbon black (manufactured by Showa Denko K.K., "Acetylene Black HS-100") was used as the conductivity imparting agent (B) (see Table 1).

Then, the resulting rubber composition was press cured at 170° C. for 20 minutes, and subjected to the same evaluation test by the same evaluation method as described above. The results are shown in Table 2.

EXAMPLE 9

In this example, a conductive rubber composition was obtained by a formulation different from that of Example 7, using the same crosslinked particulate polymer (A1-5), the uncrosslinked polymer (A2), and carbon black ("Acetylene black HS-100") as in Example 8 (see Table 1). Then, the resulting rubber composition was press cured at 170° C. for 20 minutes, and subjected to the same evaluation test by the same evaluation method as described above. The results are shown in Table 2.

Comparative Example 1

A composition was produced in the same manner as in Example 1, except that the kneading set temperature of the Banbury mixer in Example 1 was set to be 50° C. (see Table 1). Then, the resulting composition was evaluated in the same manner. The results are shown in Table 2.

Comparative Example 2

In this comparative example, a combination of mutually opposite polarities of a polar crosslinked particulate polymer (NBR) and a nonpolar uncrosslinked polymer (SBR) were adopted.

The crosslinked particulate polymer (A1-4) of this comparative example was obtained in the following manner. The emulsion polymerization of a acrylonitrile-butadiene-divinylbenzene monomer mixture of a ratio of 30/60/10 (mol %) was carried out. The resulting copolymer emulsion was salified using calcium chloride, and dried. The polymerization conversion ratio at this step was found to be roughly 99%. The average particle diameter was 1 μm, and the Moony viscosity at 100° C. was 60, the SP value is 10.0.

Then, as the uncrosslinked polymer, SBR (manufactured by JSR (Co., Ltd.) "SBR1502", Moony viscosity at 100° C.; 52, SP value; 8.6) was used. As the conductivity imparting agent (B), carbon black (manufactured by Mitsubishi Carbon Co., "Dia black 3030B") was used. Thus, a conductive rubber composition was obtained by kneading in accordance with the formulation shown in Table 1 by means of a Banbury mixer at a kneading set temperature of 100° C. Then, the resulting rubber composition was press cured at 170° C. for 20 minutes, and subjected to the same evaluation test by the same evaluation method as described above. The results are shown in Table 2.

Effect of Examples 1 Through 9 and Comparative Examples 1 Through 2

According to the results of Tables 1 and 2, in Comparative Example 1, since the uncrosslinked polymer has a larger viscosity at the kneading starting temperature, the batch to batch variation (Δ) is as large as 3.0, and further, the difference between the L/L value and H/H value is also as large as 1.0. Further, the breaking extension is as small as 350%, and the hardness (duro A) is 48, i.e., a rather high value. These indicate that the compatibility with carbon black is excellent, while the carbon black is more easily mixed into lower viscosity polymers in terms of the Moony viscosities during kneading. This entails extremely unstable miscibility of carbon black, causing variations in conductivity. Further, in Comparative Example 2, because of the combination of mutually opposite polarities of a polar crosslinked particulate polymer (NBR) and a nonpolar uncrosslinked polymer (SBR), the batch to batch variation (Δ) is as large as 2.5, the difference between the L/L value and the H/H value is also as large as 1, the breaking extension is as small as 360%, and the hardness (duro A) is 48, i.e., a rather high value. As indicated from these results, since carbon black has good compatibility with a polar rubber, while being resistant to being mixed into a crosslinked rubber, the miscibility of carbon black becomes very unstable, causing variations in conductivity.

On the other hand, in any of Examples 1 through 9, the batch to batch variation (Δ) is 0.2 to 0.4 Ω·cm or less, which is about 1/10 of the corresponding values in Comparative Examples 1 and 2. And, in any of Examples 1 through 9, the position variation in same valcanization sheet (standard variation) is also 0.01 to 0.04, which is about 1/10 of the corresponding values in Comparative Examples 1 and 2. Further, in any of Examples 1 through 9, the difference between the L/L value and the H/H value is 0.1 to 0.7 Ω·cm, and it is thus much smaller as compared with both the comparative examples. Especially, in Examples 1 through 3, Example 5, and Example 8, the values are 0.1 to 0.5 Ω·cm, i.e., very small values. The breaking extension is 400 to 650%, which is much larger as compared with both the comparative examples. Especially, in Example 2, the value is 650%, i.e., a very large value. Further, in any of Examples 1 through 8, the hardness (duro A) is 35 to 45, which is smaller as compared with both the comparative examples. Especially, in Example 3, the value is 35, i.e., a very small value. There is also shown sufficient practical utility in terms of compression set.

Apparent from the foregoing, by using the rubber composition according to the examples of the present invention, there can be provided a rubber member (rubber sheet, and the like.) which exhibits performances in all respects in a well-balanced manner, that is, which exhibits less positional variations in electric resistance, and a small range of variations in electric resistance values even for an environmental change from low temperature and low humidity to high temperature to high humidity, and has a low hardness and a large breaking extension.

Further, as shown in Examples 1 through 9, the above-described conductive rubber composition exhibiting very excellent properties can be easily manufactured by using the nonpolar SBR crosslinked particulate polymer and polar NBR uncrosslinked polymer, and setting the kneading set temperatures at 80° C. and 100° C.

It is noted that the present invention is not limited to the foregoing concrete examples, which can be therefore changed and modified in various terms in accordance with its purpose and application within the scope of the invention.

What is claimed is:

1. A conductive rubber composition comprising, a nonpolar crosslinked particulate polymer (A1), an uncrosslinked polar polymer (A2), and a conductivity imparting agent (B), wherein said conductivity imparting agent (B) exists more in said uncrosslinked polymer (A2) than in said crosslinked particulate polymer (A1).

2. The conductive rubber composition according to claim 1, wherein a difference in the solubility parameter between said uncrosslinked polymer (A2) and said crosslinked particulate polymer (A1) is not less than 0.5, wherein said solubility parameter is a weight fraction of an insoluble polymer relative to a total weight of polymer, said weight fraction of an insoluble polymer determined by extracting a polymer held in a 325 mesh wire basket with boiling toluene for six hours.

3. The conductive rubber composition according to claim 2, wherein said crosslinked particulate polymer (A1) is obtained by copolymerizing a plurality of crosslinkable monomers.

4. The conductive rubber composition according to claim 3, wherein said crosslinked particulate polymer (A1) is selected from the group consisting of isoprene rubber, butadiene rubber, styrene-butadiene rubber, butyl rubber, ethylene-α-olefin-nonconjugated diene rubber, and ethylene-vinyl acetate rubber.

5. The conductive rubber composition according to claim 3, wherein said crosslinked particulate polymer (A1) has a toluene insoluble matter content of 80% by weight or more.

6. The conductive rubber composition according to claim 3, wherein said crosslinked particulate polymer (A1) has an average particle diameter of 25 μm or less, and a duro A hardness of 45 to 80.

7. The conductive rubber composition according to claim 3, wherein said uncrosslinked polymer (A2) is selected from the group consisting of chloroprene rubber, acrylonitrile-butadiene rubber, hydrogenated acrylonitrile-butadiene rubber, acrylic rubber, ethylene-acrylic rubber, chlorosulfonated polyethylene, polysulfide rubber, epichlorohydrin rubber, epichloroethylene oxide rubber, urethane rubber, silicone rubber and fluororubber.

8. The conductive rubber composition according to claim 3, wherein the mixing ratio of said crosslinked particulate polymer (A1) to said uncrosslinked polymer (A2) is 25/75 to 75/25 on a weight basis.

9. The conductive rubber composition according to claim 3, wherein said conductivity imparting agent (B) is carbon black.

10. The conductive rubber composition according to claim 9, wherein the carbon black is selected from the group consisting of EC (Extra Conductive), ECF (Extra Conductive Furnace), CF (Conductive Furnace) and acetylene black.

11. The conductive rubber composition according to claim 3, wherein said crosslinked particulate polymer (A1) is styrene-butadiene rubber, said uncrosslinked polymer (A2) is acrylonitrile-butadiene rubber, and said conductivity imparting agent is selected from the group consisting of EC (Extra Conductive), ECF (Extra Conductive Furnace), CF (Conductive Furnace), and acetylene black.

12. The conductive rubber composition according to claim 3, further comprising an ionic conductivity imparting agent.

13. The conductive rubber composition according to claim 12, wherein said ionic conductivity imparting agent is selected from the group consisting of $LiCF_3SO_3$, $NaClO_4$, $LiClO_4$, $LiAsF_6$, $LiBF_4$, NaSCN, $(NH_4)_2SO_4$, KSCN, NaCl, $NH_4Cl$, $NH_4NO_3$, $Ca(ClO_4)_2$, $Ba(ClO_4)_2$, quaternary ammonium salts of perchloric acid represented by the following formula (1), and aliphatic carboxylic acid diesters of polyalkylene glycol represented by the following formula (II):

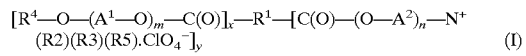

$$[R^4\text{—}O\text{—}(A^1\text{—}O)_m\text{—}C(O)]_x\text{—}R^1\text{—}[C(O)\text{—}(O\text{—}A^2)_n\text{—}N^+(R2)(R3)(R5).ClO_4^-]_y \qquad (I)$$

(where $R^1$ denotes an aliphatic or aromatic carboxylic acid of 2 to 20 carbon atoms; $R^2$ and $R^3$ each individually denote an alkyl group of 1 to 20 carbon atoms or a hydroxyalkyl group of 1 to 20 carbon atoms; $A^1$ and $A^2$ each individually denote an alkylene group of 2 to 4 carbon atoms; m is an integer of 0 to 20; n is an integer of 1 to 20; $R^4$ denotes an alkyl group of 4 to 22 carbon atoms, an aralkyl group of 7 to 20 carbon atoms, or R'CONHR"—(where R' is an alkyl group of 1 to 20 carbon atoms or an alkenyl group of 1 to 20 carbon atoms, and R" is an alkylene group of 1 to 10 carbon atoms); $R^5$ denotes an alkyl group of 1 to 20 carbon atoms; x is an integer 0 through 3; y is an integer 1 through 4; and (x+y) equals the valence of $R^1$)

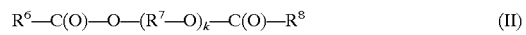

$$R^6\text{—}C(O)\text{—}O\text{—}(R^7\text{—}O)_k\text{—}C(O)\text{—}R^8 \qquad (II)$$

(where $R^6$ and $R^8$ each individually denote an aliphatic monocarboxylic acid of 4 to 18 carbon atoms; $R^7$ denotes an alkylene group of 2 to 4 carbon atoms; and k is an integer of 2 to 30).

14. A conductive rubber composition comprising, a nonpolar crosslinked particulate polymer (A1), an uncrosslinked polar polymer (A2), and a conductivity imparting agent (B),
wherein said conductivity imparting agent (B) exists more in said uncrosslinked polymer (A2) than in said crosslinked particulate polymer (A1),
a difference in the solubility parameter between said uncrosslinked polymer (A2) and said crosslinked particulate polymer (A1) is not less than 0.5, wherein said solubility parameter is a weight fraction of an insoluble polymer relative to a total weight of polymer, said weight fraction of an insoluble polymer determined by extracting a polymer held in a 325 mesh wire basket with boiling toluene for six hours,
said crosslinked particulate polymer (A1) is obtained by copolymerizing a plurality of crosslinkable monomers, and
said crosslinked particulate polymer (A1) has a toluene insoluble matter content of 80% by weight or more.

15. A conductive rubber composition comprising a nonpolar crosslinked particulate polymer (A1), an uncrosslinked polar polymer (A2), and a conductivity imparting agent (B),
wherein said conductivity imparting agent (B) exists more in said uncrosslinked polymer (A2) than in said crosslinked particulate polymer (A1),
a difference in the solubility parameter between said uncrosslinked polymer (A2) and said crosslinked particulate polymer (A1) is not less than 0.5, wherein said solubility parameter is a weight fraction of an insoluble polymer relative to a total weight of polymer, said weight fraction of an insoluble polymer determined by extracting a polymer held in a 325 mesh wire basket with boiling toluene for six hours,
said crosslinked particulate polymer (A1) is obtained by copolymerizing a plurality of crosslinkable monomers, and
said crosslinked particulate polymer (A1) has an average particle diameter of 25 μm or less, and a duro A hardness of 45 to 80.

16. A conductive rubber composition characterized in being manufactured by starting the kneading of a mixture at such a temperature (T °C.) wherein the following expression (1) holds, said mixture comprising a crosslinked particulate polymer (A1), an uncrosslinked polymer (A2), and a conductivity imparting agent (B), said crosslinked particulate polymer (A1) being a nonpolar polymer, and said uncrosslinked polymer (A2) being a polar polymer:
Moony viscosity (T °C.) of said uncrosslinked polymer (A2)/Moony viscosity (T °C.) of said particulate polymer (A1)$\leq 1.0$.

17. The conductive rubber composition according to claim 16, wherein said crosslinked particulate polymer (A1) is obtained by copolymerizing a plurality of crosslinkable monomers.

18. The conductive rubber composition according to claim 17, wherein the particulate polymer (A1) is styrene-butadiene rubber, the uncrosslinked polymer (A2) is acrylonitrile-butadiene rubber, and a kneading starting temperature is 80° C. or more.

* * * * *

UNITED STATES PATENT AND TRADEMARK OFFICE
CERTIFICATE OF CORRECTION

PATENT NO. : 6,458,883 B1
DATED : October 1, 2002
INVENTOR(S) : Takashima et al.

It is certified that error appears in the above-identified patent and that said Letters Patent is hereby corrected as shown below:

<u>Title page,</u>
Insert Item -- [30]     Foreign Application Priority Data
    Jan. 14, 1999    (JP) .................................... 11-008320 --

Signed and Sealed this

Twenty-fourth Day of May, 2005

JON W. DUDAS
*Director of the United States Patent and Trademark Office*